United States Patent
Ziskovsky et al.

(10) Patent No.: US 12,049,925 B2
(45) Date of Patent: Jul. 30, 2024

(54) SYSTEMS AND METHOD FOR AN ELECTRIC MOTOR WITH SPRAY RING

(71) Applicant: Dana Heavy Vehicle Systems Group, LLC, Maumee, OH (US)

(72) Inventors: Darren J. Ziskovsky, Bowling Green, OH (US); Aaron D. Gries, Perrysburg, OH (US); Martin D. Fairchild, Tekonsha, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 213 days.

(21) Appl. No.: 17/138,726

(22) Filed: Dec. 30, 2020

(65) Prior Publication Data
US 2022/0205486 A1  Jun. 30, 2022

(51) Int. Cl.
*F16C 35/067* (2006.01)
*B29C 45/16* (2006.01)
*F16C 33/10* (2006.01)

(52) U.S. Cl.
CPC ........ *F16C 35/067* (2013.01); *B29C 45/1607* (2013.01); *F16C 33/10* (2013.01)

(58) Field of Classification Search
CPC ........ F16C 35/067; F16C 33/10; B29C 45/16; B29C 45/1607; B29C 45/07; B29C 2045/1623; B29C 2045/1653; B29C 45/14344; B29C 45/2628; H02K 3/24; H02K 9/19
See application file for complete search history.

(56) References Cited

U.S. PATENT DOCUMENTS

| | | | |
|---|---|---|---|
| 2,862,120 A | 11/1958 | Onsurd | |
| 5,111,090 A | 5/1992 | Otake et al. | |
| 5,859,482 A | 1/1999 | Crowell et al. | |
| 5,881,909 A * | 3/1999 | Crain | B29C 45/2628 |
| | | | 220/676 |
| 6,397,450 B1 | 6/2002 | Ozmat | |
| 6,579,202 B2 | 6/2003 | El-Antably et al. | |
| 6,639,334 B2 | 10/2003 | Chen et al. | |
| 7,009,317 B2 | 3/2006 | Cronin et al. | |
| 7,023,699 B2 | 4/2006 | Glovatsky et al. | |
| 7,508,100 B2 | 3/2009 | Foster | |
| 7,675,209 B2 | 3/2010 | Masoudipour et al. | |
| 7,816,824 B2 | 10/2010 | Jöckel | |

(Continued)

FOREIGN PATENT DOCUMENTS

| | | | | |
|---|---|---|---|---|
| CN | 111342586 | * | 6/2020 | ............... H02K 3/24 |
| DE | 102009009819 A1 | | 8/2010 | |

(Continued)

OTHER PUBLICATIONS

Hombsch, M. et al., "Electric Axle Assembly," U.S. Appl. No. 16/938,737, filed Jul. 24, 2020, 30 pages.

*Primary Examiner* — Christopher M Rodd
*Assistant Examiner* — Shibin Liang
(74) *Attorney, Agent, or Firm* — McCoy Russell LLP

(57) ABSTRACT

Various systems and methods are provided for an electric motor of a vehicle, and particularly to an electric motor including a coolant spray ring. In one example, a method of manufacture comprises forming, via injection molding, a unitary motor spray ring including a plurality of axial grooves joined to a plurality of nozzle orifices.

20 Claims, 7 Drawing Sheets

(56) References Cited

U.S. PATENT DOCUMENTS

| | | |
|---|---|---|
| 7,839,031 B2 | 11/2010 | Tilton et al. |
| 8,169,110 B2 | 5/2012 | Swales et al. |
| 8,519,577 B2 | 8/2013 | Stiesdal |
| 9,136,745 B2 | 9/2015 | Nagahama et al. |
| 9,160,214 B2 | 10/2015 | Matsuda |
| 9,431,879 B2 | 8/2016 | Kikuchi et al. |
| 9,789,625 B2 | 10/2017 | Engelfried et al. |
| 10,128,705 B2 | 11/2018 | Yang et al. |
| 2002/0074874 A1 | 6/2002 | Tong et al. |
| 2004/0123980 A1 | 7/2004 | Queheillalt et al. |
| 2006/0232143 A1 | 10/2006 | Purvines et al. |
| 2009/0121562 A1 | 5/2009 | Mm |
| 2010/0320851 A1* | 12/2010 | Lambka .................. H02K 9/19 310/54 |
| 2011/0181136 A1* | 7/2011 | Nakamori ................ H02K 3/24 310/54 |
| 2019/0003572 A1 | 1/2019 | Dellal et al. |

FOREIGN PATENT DOCUMENTS

| | | |
|---|---|---|
| EP | 0627804 A2 | 12/1994 |
| WO | 0237648 A1 | 5/2002 |
| WO | 2017161527 A1 | 9/2017 |

\* cited by examiner

SYSTEMS AND METHOD FOR AN ELECTRIC MOTOR WITH SPRAY RING

TECHNICAL FIELD

The present description relates generally to systems and methods for an electric motor of a vehicle, and more specifically, to an electric motor including a coolant spray ring.

BACKGROUND AND SUMMARY

Electric motors often include heat sinks or other components configured to control motor temperature. Some electric motors are configured to receive a coolant, where heat produced by a motor is transferred from the motor to the coolant in order to reduce the motor operating temperature. In such motors, the coolant may flow across several surfaces of the motor to absorb heat from the motor surfaces.

However, the inventors herein have recognized potential issues with such systems. As one example, as the coolant flows through an electric motor, some of the components of the electric motor may not be adequately cooled by the coolant due to the arrangement of the components outside of a flow path of the coolant. Additionally, some components of the electric motor may operate at higher temperatures relative to other components, and the coolant may not adequately contact the components having the higher operating temperatures.

In one example, the issues described above may be addressed by a method of manufacture comprising forming, via injection molding, a unitary motor spray ring including a plurality of axial grooves joined to a plurality of nozzle orifices.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below:

FIGS. 2-7 are shown to scale, although other relative dimensions may be used, if desired.

DETAILED DESCRIPTION

The following description relates to systems and methods for an electric motor including a spray ring. A vehicle, such as the vehicle shown schematically by FIG. 1, includes an electric motor, such as the electric motor shown by FIG. 2. The electric motor includes a coolant jacket and a spray ring configured to cool a stator, as shown by FIG. 3. The spray ring includes a plurality of axial grooves configured to receive a coolant, such as oil, and flow the coolant to a plurality of nozzle orifices joined to the axial grooves by nozzle guide surfaces, as shown by FIG. 6. The nozzle guide surfaces guide a spray of coolant from the nozzle orifices toward the stator, and particularly, toward end windings of the stator. The spray ring may be formed via injection molding to a mold assembly in some examples, such as the mold assembly shown by FIG. 5. The mold assembly may include a plurality of retractable pins, such as the pin shown by FIG. 7, configured to form the axial grooves of the spray ring. Coolant may flow through the spray ring and spray toward the stator to cool the stator according to the method illustrated by the flow chart of FIG. 8. In this way, by forming the spray ring via injection molding to include the plurality of molded nozzle guide surfaces shaped to guide the spray of coolant from the nozzle orifices toward the stator and end windings, the stator and end windings may be more effectively cooled by the coolant. As a result, a performance and/or durability of the electric motor may be increased. Additionally, the injection molding of the spray ring may reduce a cost and/or weight of the spray ring relative to other manufacturing processes.

Figure 1:
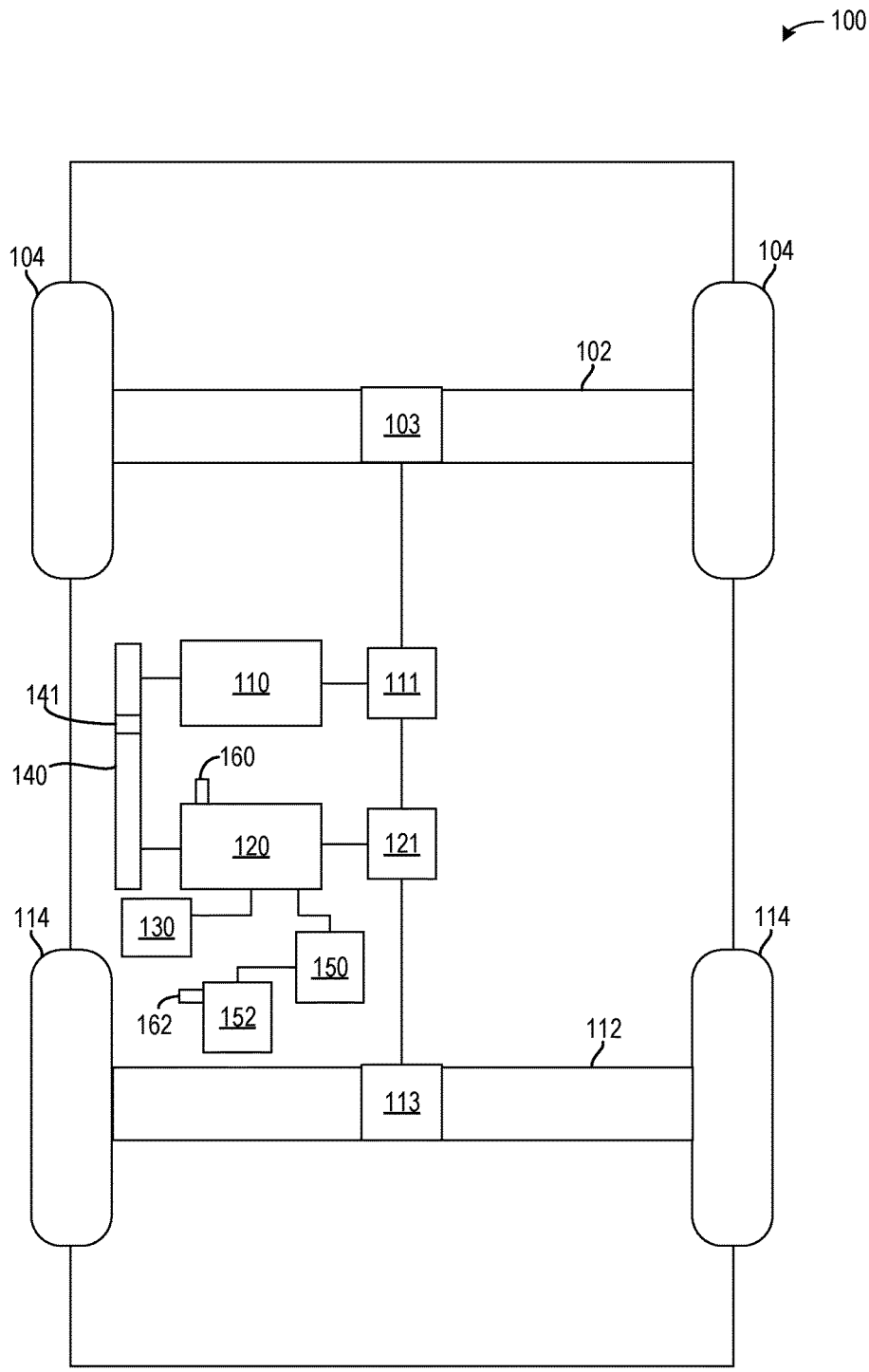
FIG. 1 schematically shows a vehicle including an electric motor.

Referring to FIG. 1, a vehicle 100 is shown schematically. The vehicle 100 includes a first shaft 102 and a second shaft 112. The first shaft 102 may be configured to drive a first set of wheels 104 of the vehicle 100 and the second shaft 112 may be configured to drive a second set of wheels 114 of the vehicle 100. In one example, the first shaft 102 is arranged near a front of the vehicle 100 and the second shaft 112 is arranged near a rear of the vehicle 100.

The vehicle 100 may include an engine 110 coupled to a first gearbox 111. In some examples, the engine 110 includes an electric motor 120 coupled to a second gearbox 121. Each of the first gearbox 111 and the second gearbox 121 may transfer power to a first differential 103 arranged on the first shaft 102 and a second differential 113 arranged on the second shaft 112. In one example, the engine 110 and the electric motor 120 are arranged in a power-series hybrid configuration. However, it will be appreciated by those of ordinary skill in the art that the hybrid configuration of the vehicle 100 may be in any form without departing from the scope of the present disclosure. As one example, the vehicle 100 may be adjustable to a plurality of different modes. In one example mode, the vehicle 100 may be propelled via torque provided to the wheels by only the engine 110. In another example mode, the vehicle 100 may be propelled via torque provided to the wheels by only the electric motor 120. In yet another example, the vehicle 100 may be propelled via torque provided by both of the engine 110 and the electric motor 120. In some examples, both of the engine 110 and electric motor 120 may be coupled to the first gearbox 111 and/or second gearbox 121.

The electric motor 120 is configured to receive energy (e.g., electrical energy) from a power source 130. The power source 130 may be a battery, as one example. The electric motor 120 and the engine 110 may be fluidly coupled to a common cooling system 140. In one example, the cooling system 140 flows a liquid, such as oil, coolant, water, or the like, to coolant passages of each of the engine 110 and the electric motor 120. In other examples, one or both of the electric motor 120 and engine 110 may be fluidly coupled to separate cooling systems. For example, the electric motor 120 may be fluidly coupled to a dedicated electric motor cooling system including a pump and a plurality of coolant passages, where the plurality of coolant passages are configured to receive coolant (e.g., oil) flowing from a coolant outlet of the electric motor 120 and flow coolant to a coolant inlet of the electric motor 120.

As described above, vehicle 100 may include electric motor 120 configured to provide torque to the wheels of the vehicle 100 to propel the vehicle. In some examples, the vehicle 100 may include electric motor 152 configured to provide torque to power one or more other devices onboard the vehicle 100. For example, electric motor 152 may be configured to power to (e.g., provide torque to) a cooling fan, compressor, or other device of the vehicle 100. The electric motor 152 and electric motor 120 may be configured to receive coolant (e.g., oil) from a same cooling system, in some examples (e.g., cooling system 140).

Vehicle 100 additionally includes electronic controller 150. The controller 150 receives signals from the various sensors of FIG. 1 and employs the various actuators of FIG. 1 to adjust engine operation based on the received signals and instructions stored on a memory of the controller. For example, adjusting an amount of coolant flowing to the electric motor 152 and/or electric motor 120 may include adjusting an amount of energization and/or energization timing of a pump (e.g., pump 141) configured to pump the coolant to the electric motor 152 and/or electric motor 120.

The controller 150 may receive input from sensors of vehicle 100, which may include various temperature sensors (e.g., temperature sensor 160 configured to measure a temperature of electric motor 120, temperature sensor 162 configured to measure a temperature of electric motor 152, etc.), pressure sensors, speed sensors, throttle sensors, battery charge sensors, air-fuel ratio sensors, etc. The controller 150 may send control signals to various actuators communicatively coupled to electric motor 120, electric motor 152, engine 110, and/or other components of vehicle 100. The various actuators may include, for example, various valves, throttles, fuel injectors, etc. The types of sensors and actuators listed herein are for illustrative purposes and any type of sensors and/or actuators may be included without departing from the scope of this disclosure.

The electronic controller 150 may be a microcomputer, which may include a microprocessor unit, input/output ports, and an electronic storage medium for executable programs and calibration values. Controller 150 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. The controller 150 may be electrically coupled to power source 130.

Figure 2:
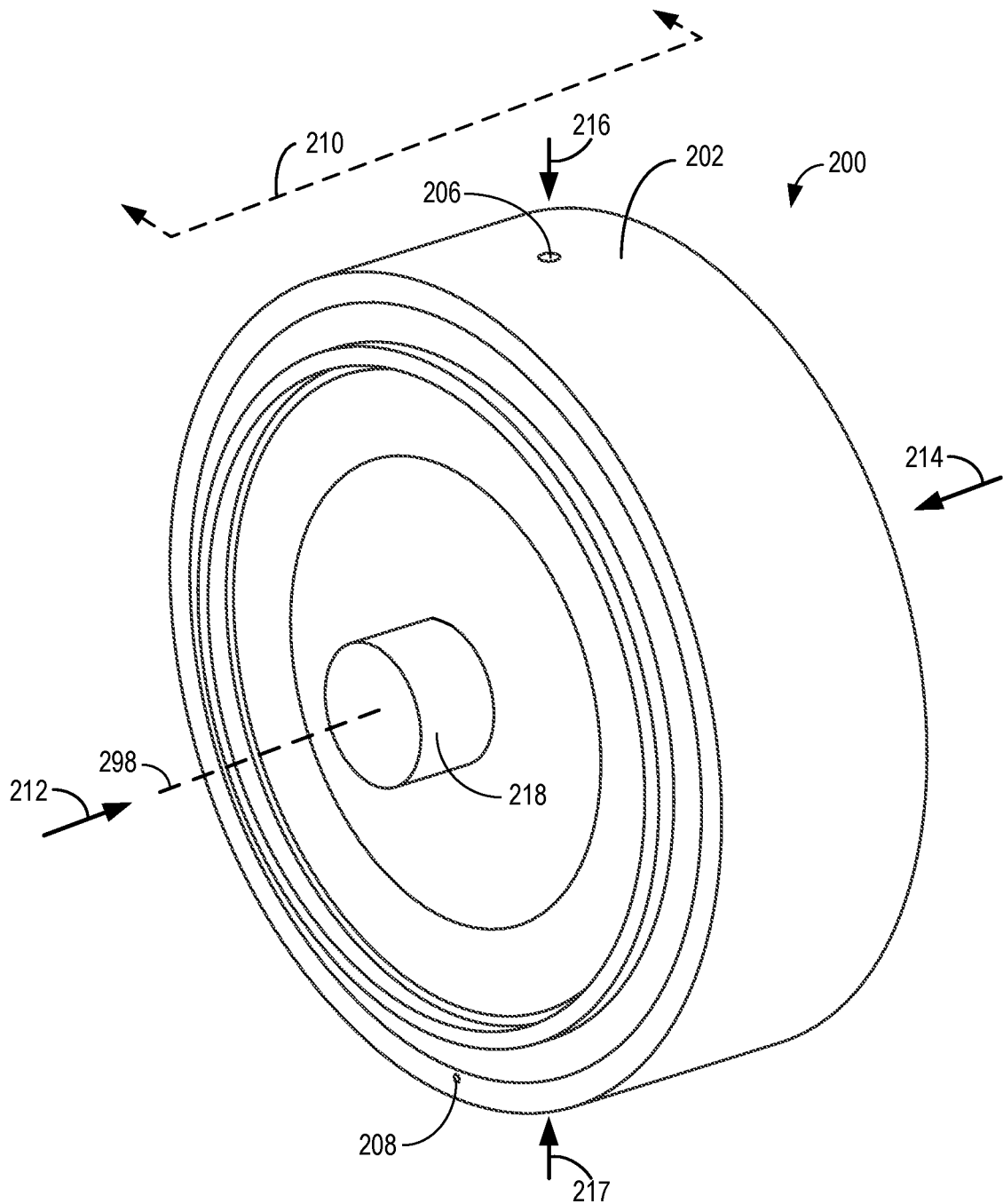
FIG. 2 shows a perspective view of an electric motor.
Figure 3:
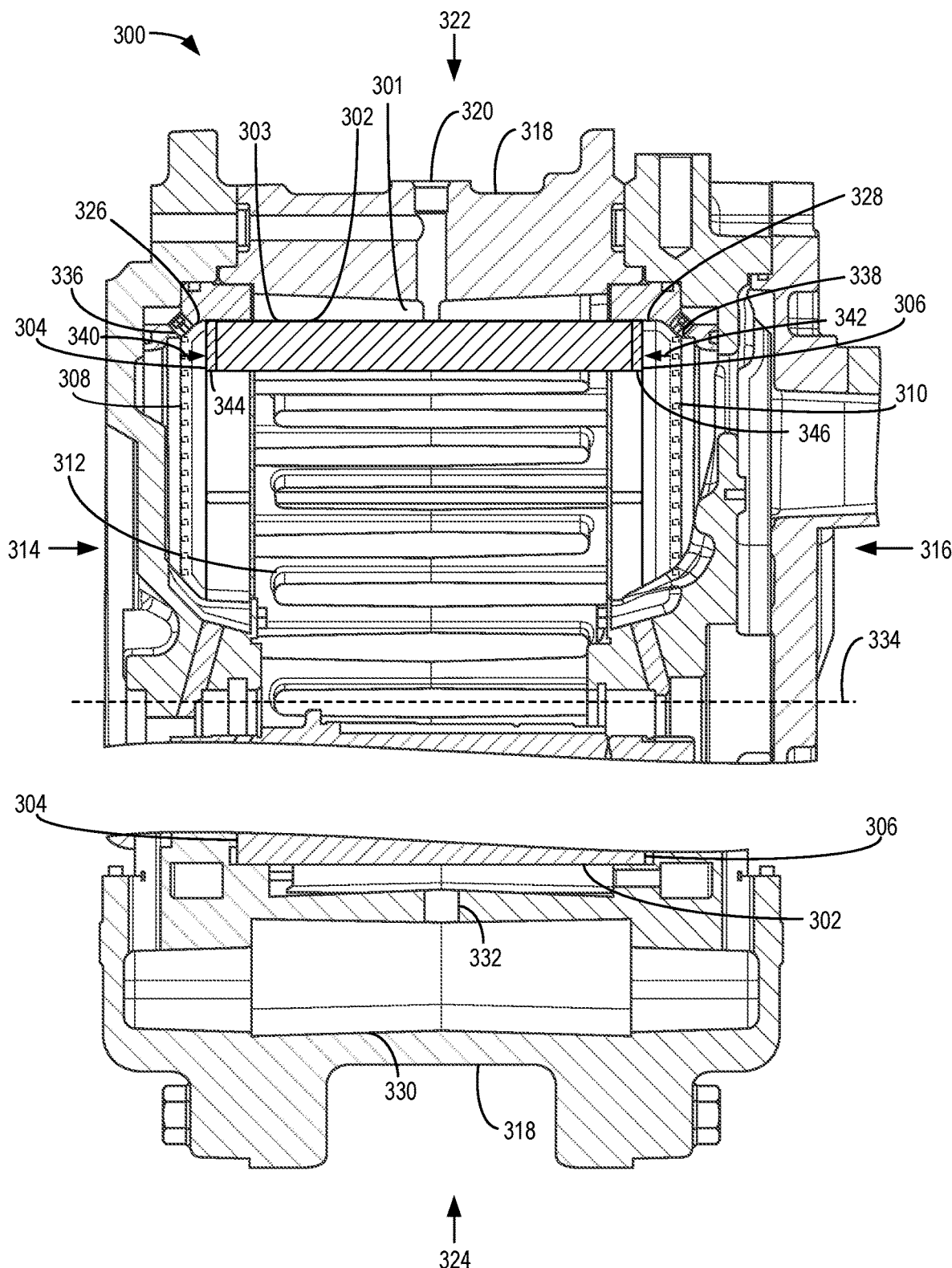
FIG. 3 shows a cross-sectional side view of an electric motor including a spray ring.

Referring to FIG. 2, a perspective view of an electric motor 200 is shown. In some examples, the electric motor 200 may be similar to, or the same as, the electric motor 120 or the electric motor 152 described above with reference to FIG. 1. For example, the electric motor 200 may be configured to provide torque to one or more wheels of a vehicle, such as the vehicle 100 described above with reference to FIG. 1. As another example, the electric motor 200 may be configured to drive one or more devices of the vehicle, such as one or more fans, compressors, etc. (e.g., similar to the electric motor 152 described above).

The electric motor 200 includes a housing 202 which houses a plurality of electric motor components including a stator, windings, a rotor, and the like. In some examples, the housing 202 may be physically coupled to the electric motor 200 via welds, fusions, adhesives, fasteners, or other similar coupling elements. Housing 202 includes a coolant inlet 206 and a coolant outlet 208. In some examples, the coolant inlet 206 and coolant outlet 208 may be arranged at opposing ends of the housing 202. Coolant (e.g., oil) may flow into the electric motor 200 via the coolant inlet 206, and coolant may flow out of the electric motor 200 via the coolant outlet 208.

Electric motor 200 includes a rotor and a stator disposed within the housing 202. Energization of the electric motor 200 may include energizing the rotor and stator via a power source coupled to the electric motor 200 (e.g., power source 130 described above with reference to FIG. 1). During conditions in which the electric motor 200 is energized, output shaft 218 may be driven to rotate around central axis 298 of the electric motor 200 by the electromechanical coupling between the stator and rotor (e.g., to provide torque to wheels of the vehicle, drive one or more vehicle devices, etc.). In some examples, the electric motor 200 may include a coolant jacket arranged between the stator and the housing 202.

Referring to FIG. 3, a cross-sectional side view of an electric motor 300 is shown. The electric motor 300 includes at least one spray ring configured to spray a coolant (e.g., oil) toward a stator 302 disposed within a housing 318 of the electric motor 300. In the example shown by FIG. 3, the electric motor 300 includes a first spray ring 326 arranged opposite to a second spray ring 328 across the stator 302 (e.g., in a direction of a central axis of the stator 302, where the central axis is parallel with axis 334). In some examples, the electric motor 300 may be similar to, or the same as, the electric motor 200 shown by FIG. 2 and described above and/or the electric motor 120 or electric motor 152 shown by FIG. 1 and described above. The first spray ring 326 and second spray ring 328 may each be referred to herein as motor spray rings, electric motor spray rings, and/or unitary electric motor spray rings.

The first spray ring 326 is arranged at a first end 314 of the electric motor 300, and the second spray ring 328 is arranged at an opposing, second end 316 of the electric motor 300. A portion of the stator 302 is shown in FIG. 3, where the stator 302 has an annular shape. The electric motor 300 includes a coolant jacket 312 surrounding the stator 302 and having an annular shape, with a diameter of the coolant jacket 312 being larger than a diameter of the stator 302. For illustrative purposes, FIG. 3 shows a top end 322 of the electric motor 300 separate from a bottom end 324 of the electric motor 300, with a central portion of the electric motor 300 not shown by FIG. 3. However, it should be understood that the electric motor 300 includes both of the top end 322 and the bottom end 324.

The stator 302 includes a first end surface 304 arranged toward the first spray ring 326 (e.g., toward the first end 314), and a second end surface 306 arranged toward the second spray ring 328 (e.g., toward the second end 316). In some examples, the coolant jacket 312 and housing 318 may be a single, unitary piece (e.g., the coolant jacket 312 and housing 318 may be molded together). The first spray ring 326 and the second spray ring 328 are each disposed within the housing 318 and are oriented to spray a coolant (e.g., oil) toward the stator 302 (e.g., directly toward end windings of the stator 302) in order to cool the stator 302 (e.g., cool the end windings of the stator 302). In particular, the first spray ring 326 includes a plurality of nozzle orifices 308 arranged to spray coolant toward the stator 302 at the first end 314 (e.g., spray coolant towards the first end surface 304 of the stator 302), and the second spray ring 328 includes a plurality of nozzle orifices 310 arranged to spray coolant towards the stator 302 at the second end 316 (e.g., spray coolant towards the second end surface 306 of the stator 302). In the view shown by FIG. 3, the nozzle orifices 308 and the nozzle orifices 310 are illustrated schematically. However, the nozzle orifices 308 and the nozzle orifices 310 may be similar to the examples of nozzle orifices described below with reference to FIGS. 4-8.

In some examples, the first spray ring 326 and/or the second spray ring 328 may be formed via injection molding. For example, the first spray ring 326 may be molded as a single, unitary piece via injection molding along with the nozzle orifices 308 and other features of the first spray ring 326. The first spray ring 326 may be formed from a thermoplastic material, in some examples. In such examples, because the first spray ring 326 is formed as a single, unitary piece via injection molding, the first spray ring 326 may be molded with the nozzle orifices 308 and other features such that the nozzle orifices 308 and other features may be formed in the first spray ring 326 without drilling or other machining processes. Forming the first spray ring 326 in this way may increase an ease of manufacturing of the first spray ring 326 and may reduce a cost of the first spray ring 326 and/or electric motor 300. Although the first spray ring 326 is described above as being formed via injection molding, it should be understood that the second spray ring 328 may be formed via injection molding as well.

The housing 318 includes a coolant inlet 320 arranged at the top end 322 in the example shown by FIG. 3. Although the coolant inlet 320 is shown at the top end 322, in some examples the coolant inlet 320 may be arranged at a different portion of the electric motor 300. Coolant, such as oil, may flow through the coolant inlet 320 and into a clearance 301 surrounding the stator 302 (e.g., where the clearance 301 may be formed at least in part by the coolant jacket 312 and an outer circumferential surface 303 of the stator 302). The coolant may flow through the clearance 301 around the stator 302 from the top end 322 toward the bottom end 324. The coolant may additionally flow through a clearance 336 disposed between an outer circumferential surface of the first spray ring 326 and the coolant jacket 312, where the clearance 336 is fluidly coupled (e.g., in fluidic communication) with the nozzle orifices 308 of the first spray ring 326. Similarly, the coolant may flow through a clearance 338 disposed between an outer circumferential surface of the second spray ring 328 and the coolant jacket 312, where the clearance 338 is fluidly coupled to the nozzle orifices 310 of the second spray ring 328. In this configuration, the coolant may flow around the stator 302 and to the nozzle orifices 308 of the first spray ring 326 and the nozzle orifices 310 of the second spray ring 328. The coolant flowing to the nozzle orifices 308 may be sprayed from the first spray ring 326 in a direction of the stator 302 (e.g., a direction of the first end surface 304 and end windings), as indicated by direction arrow 340. The coolant flowing to the nozzle orifices 310 may be sprayed from the second spray ring 328 in a direction of the stator 302 (e.g., a direction of the second end surface 306), as indicated by direction arrow 342. The first end surface 304 of the stator 302 may include a first end winding 344, and the second end surface 306 of the stator 302 may include a second end winding 346. Coolant may be sprayed from the first spray ring 326 directly toward the first end winding 344 (e.g., to cool the first end winding 344), and coolant may be sprayed from the second spray ring 328 directly toward the second end winding 346 (e.g., to cool the second end winding 346).

Coolant sprayed by the nozzle orifices 308 may be sprayed in the direction of the first end winding 344, and coolant sprayed by the nozzle orifices 310 may be sprayed in the direction of the second end winding 346. The coolant sprayed from the nozzle orifices 308 and the nozzle orifices 310 toward the first end winding 344 and the second end winding 346, respectively, may absorb heat from the end windings and may reduce a temperature of the end windings. As a result, the coolant sprayed from the nozzle orifices 308 and the nozzle orifices 310 may cool the stator 302. In some examples, the nozzle orifices 308 of the first spray ring 326 may be mirror symmetric to the nozzle orifices 310 of the second spray ring 328 (e.g., each nozzle orifice of the first spray ring 326 may be axially aligned with a respective nozzle orifice of the second spray ring 328 in the direction of the central axis). In the examples described herein, each nozzle orifice of the plurality of nozzle orifices 308 is joined to a respective nozzle guide surface of a plurality of nozzle guide surfaces of the first spray ring 326, and each nozzle orifice of the plurality of nozzle orifices 310 is joined to a respective nozzle guide surface of a plurality of nozzle guide surfaces of the second spray ring 328. Example nozzle guide surfaces are shown by FIG. 6 and described further below. In some examples, the nozzle guide surfaces of the first spray ring 326 are arranged mirror symmetric to the nozzle guide surfaces of the second spray ring 328 (e.g., a curvature of each nozzle guide surface of the first spray ring 326 is mirror symmetric to a curvature of each nozzle guide surface of the second spray ring 328).

Coolant sprayed from the nozzle orifices 308 and/or the nozzle orifices 310 may come into contact with surfaces of the stator 302 (e.g., the first end winding 344, the second end winding 346, the first end surface 304, the second end surface 306, etc.) and may cool the surfaces of the stator 302 as described above. The coolant may then flow in a direction of the bottom end 324 of the electric motor 300 and may flow through a drain passage 332 formed in the housing 318 of the electric motor 300. The drain passage 332 may be fluidly coupled (e.g., in fluidic communication) with the sump 330 of the electric motor 300 disposed at the bottom end 324. Coolant flowing to the sump 330 may be recirculated within the electric motor 300 (e.g., recirculated to the first spray ring 326, the second spray ring 328, etc.) via a coolant pump (e.g., pump 141 shown by FIG. 1), in some examples. Further, in some examples, coolant sprayed from the nozzle orifices 308 and/or the nozzle orifices 310 that comes into contact with the surfaces of the stator 302 as described above may flow in the direction of the bottom end 324 through one or more drain channels formed in the first spray ring 326 and/or second spray ring 328, similar to the examples described below with reference to FIG. 4.

Figure 4:
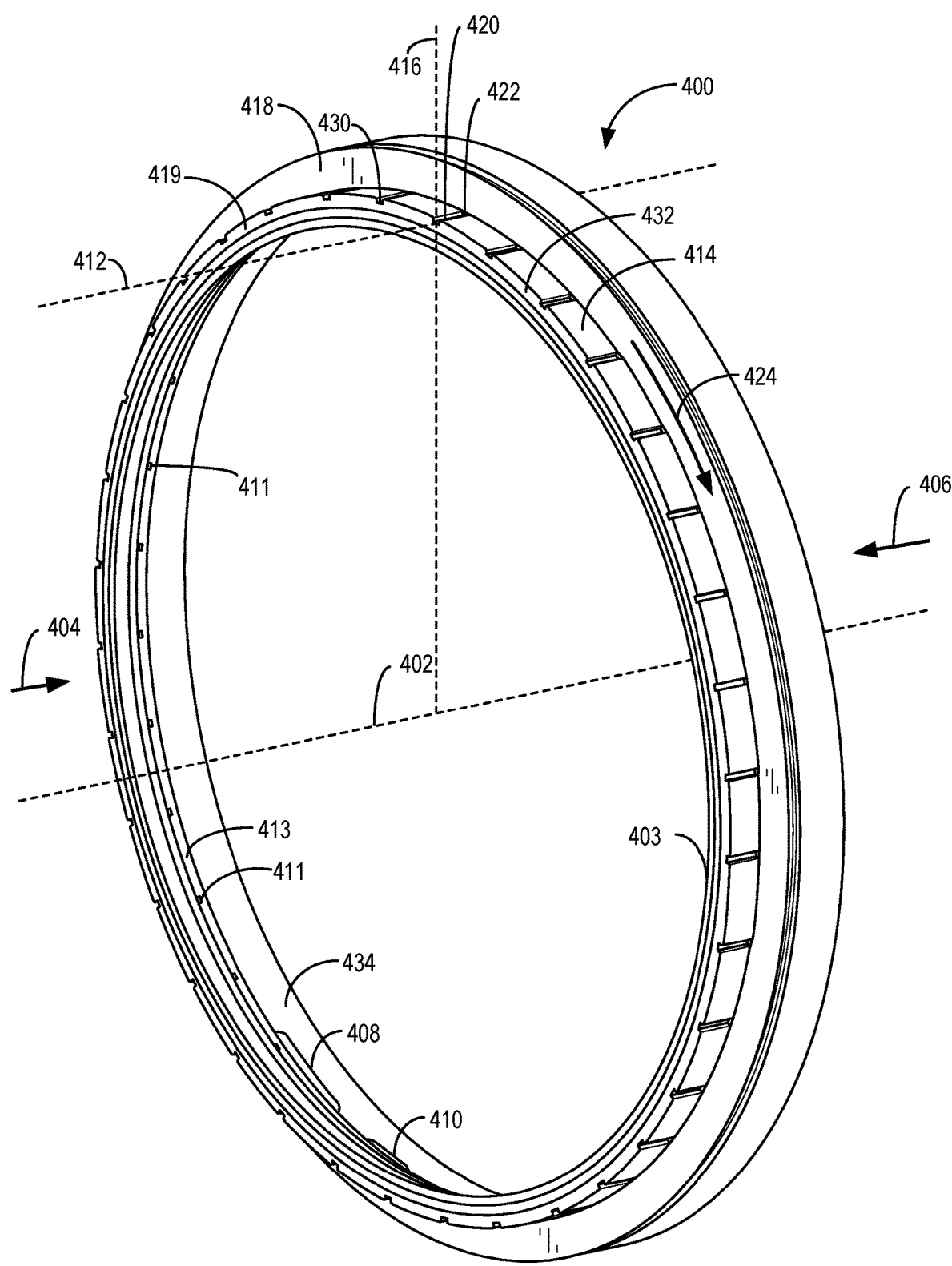
FIG. 4 shows a perspective view of a spray ring of an electric motor.

Referring to FIG. 4, a perspective view of a spray ring 400 of an electric motor is shown. In some examples, the spray ring 400 may be similar to, or the same as, the first spray ring 326 and/or second spray ring 328 shown by FIG. 3 and described above. Further, the spray ring 400 may be included within an electric motor, such as the electric motor 300 shown by FIG. 3 and described above and/or the electric motor 152 or electric motor 120 shown by FIG. 1 and described above. The stator of the electric motor may be similar to, or the same as, the stator 302 described above with reference to FIG. 3. The spray ring 400 may be referred to herein as a motor spray ring, electric motor spray ring, and/or unitary electric motor spray ring.

Similar to the examples described above with reference to FIG. 3, this spray ring 400 may be formed via injection molding as a single, unitary piece. In particular, the features of the spray ring 400 described herein may be formed integrally with the spray ring 400 (e.g., molded with the spray ring 400 during molding of the spray ring 400 via injection molding). As such, the spray ring 400 shown by FIG. 4 may be formed entirely of a same material (e.g., a same thermoplastic material) from a same mold during a single injection molding process, as described below with reference to FIG. 5.

The spray ring 400 includes a plurality of axial grooves 430 formed in an axial surface 414 (which may be referred to herein as an axial outer surface) of the spray ring 400 arranged at a first side 404 of the spray ring 400, opposite to a second side 406 of the spray ring 400 in a direction of a central axis 402 of the spray ring 400. Each of the axial grooves 430 extends parallel with the central axis 402. The first side 404 of the spray ring 400 may be arranged away from the stator of the electric motor including the spray ring 400 during conditions in which the spray ring 400 is disposed within a housing of the electric motor (e.g., housing 318 shown by FIG. 3 and described above), while the second side 406 of this spray ring 400 may be arranged toward the stator. The spray ring 400 includes a plurality of nozzle orifices 411, with the nozzle orifices oriented toward the second side 406 in order to spray coolant (e.g., oil) toward the stator during conditions in which the spray ring 400 is disposed within the electric motor. The nozzle orifices 411 are described in further detail below with reference to FIG. 6. The axial grooves 430 extend axially in a direction of the central axis 402 (e.g., parallel with the central axis 402) through the axial surface 414. The axial surface 414 is joined to a radial surface 418 of spray ring 400 and is formed integrally with the radial surface 418 (e.g., via injection molding, as described above). The radial surface 418 may be referred to herein as a radial outer surface and is arranged orthogonal to the axial surface 414. Each of the axial grooves 430 fluidly couples to a respective nozzle orifice of the nozzle orifices 411 arranged at an inner circumferential surface 413 of the spray ring 400, as described further below, such that each nozzle orifice is in fluidic communication with a respective axial groove of the axial grooves 430 (e.g., fluid, such as coolant, may flow from each axial groove to each respective nozzle orifice). The axial grooves 430 are spaced apart from each other in a circumferential direction 424 around the axial surface 414. In some examples, the axial grooves 430 may be spaced apart evenly around the axial surface 414 in the circumferential direction 424 (e.g., the plurality of axial grooves 430 may be distributed evenly around the central axis 402 such that the plurality of axial grooves 430 is radially symmetric around the central axis 402 and central opening 403 of the spray ring 400). In other examples, the spacing between adjacent axial grooves 430 may be different for different pairs of the axial grooves 430.

The axial surface 414 joins to the radial surface 418 as described above. In particular, the axial surface 414 terminates at the radial surface 418, and the axial grooves 430 formed in the axial surface 414 are open (e.g., not sealed, blocked, etc.) at first side 404 (e.g., at a second the radial surface of the spray ring 400 arranged toward the first side 404, with the axial surface 414 extending between the second radial surface 432 and the radial surface 418). Each of the axial grooves 430 may be fluidly coupled (e.g., in fluidic communication) with a clearance disposed between the axial surface 414 (e.g., which may be referred to herein as an outer circumferential surface of the spray ring 400) and a coolant jacket of the electric motor (e.g., coolant jacket 312 shown by FIG. 3 and described above). As one example, the clearance may be similar to, or the same as, clearance 336 and/or clearance 338 shown by FIG. 3 and described above. The coolant may flow through the clearance to the axial grooves 430, and the coolant flowing to the axial grooves 430 may be routed to the plurality of nozzle orifices via a plurality of nozzle guide surfaces 422, as described further below. Each nozzle guide surface of the plurality of nozzle guide surfaces 422 extends through the spray ring 400 and joins a respective axial groove of the plurality of axial grooves 430 to a respective nozzle orifice of the plurality of nozzle orifices 411.

The spray ring 400 may further include one or more drain channels, such as drain channel 408 and/or drain channel 410, configured to flow coolant has been sprayed from the spray ring 400 to a sump of the electric motor (e.g., sump 330 shown by FIG. 3 and described above). Each of the drain channels is formed at an inner circumferential surface 434 of the spray ring 400. Each of the drain channels extends in the circumferential direction 424, and each drain channel may be referred to herein as a circumferential drain channel. Each drain channel extends through a thickness of the spray ring 400, such that coolant flowing into the drain channels may flow from the inner circumferential surface 434 out of the spray ring 400 (e.g., to an exterior of the spray ring 400). During conditions in which the spray ring 400 is disposed within the electric motor, the drain channels may be arranged at a bottom end of the electric motor (e.g., bottom end 324 shown by FIG. 3 and described above). The features of the spray ring 400 are described in further detail below with reference to FIGS. 6-7.

Figure 5:
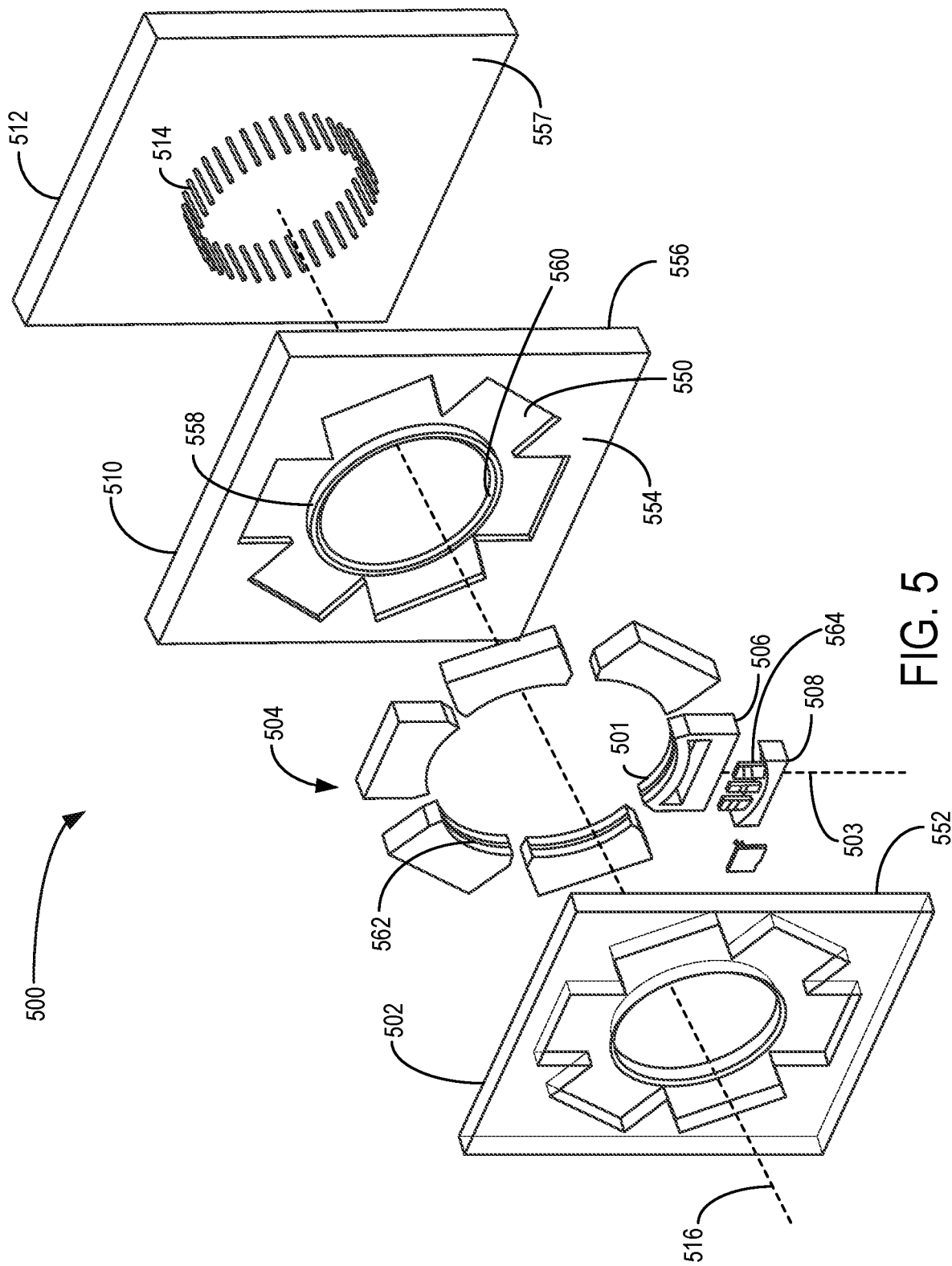
FIG. 5 shows mold assembly that may be used in the manufacture of the spray ring of FIG. 4.
Figure 6:
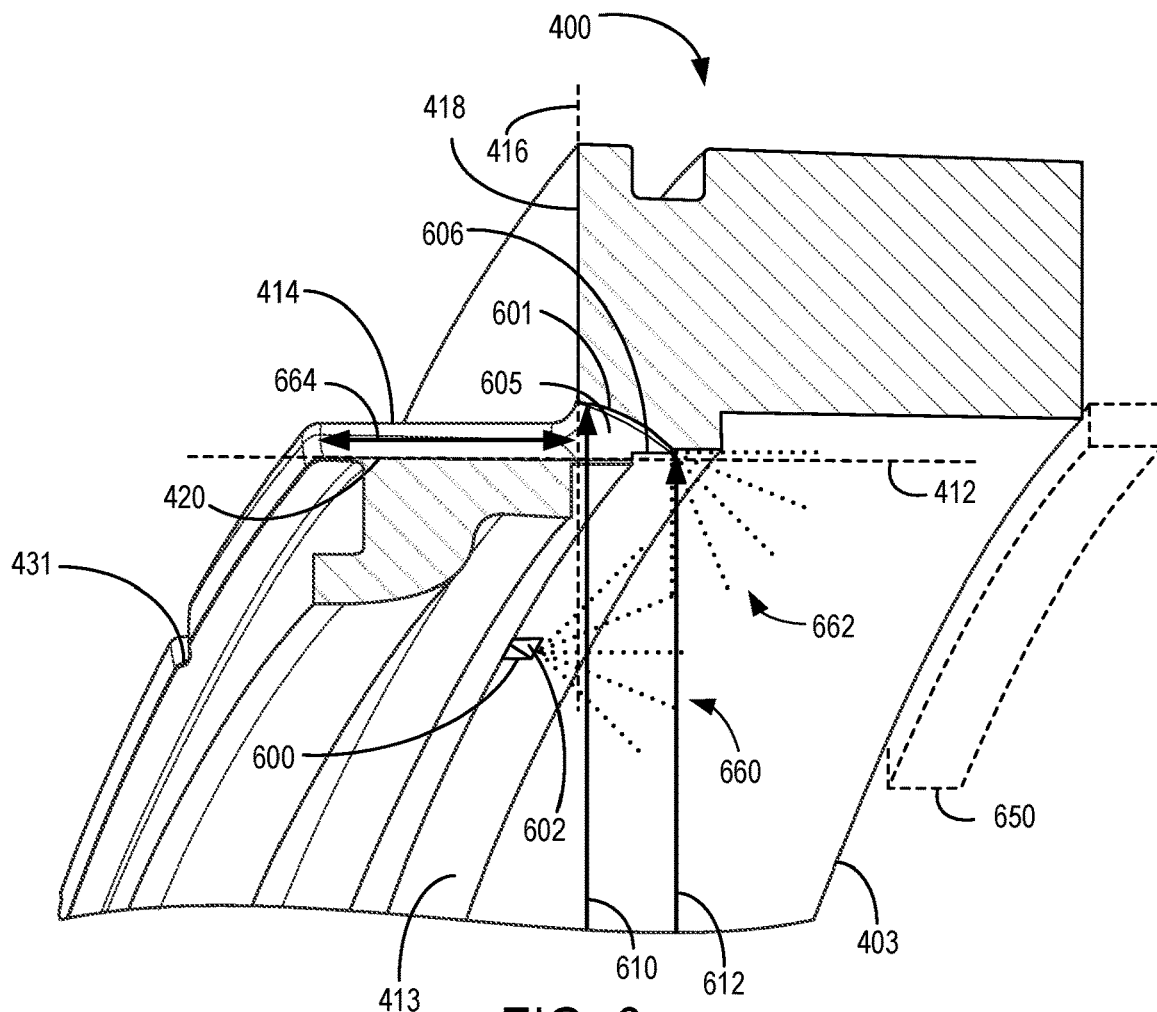
FIG. 6 shows a cross-sectional view of a portion of the spray ring of FIG. 4 including a nozzle.

Referring to FIG. 5, a mold assembly that may be used in the manufacture of the spray ring 400 of FIG. 4 is shown. In the view shown by FIG. 5, the mold assembly 500 is separated into several different components. The components shown by FIG. 5 may be assembled and/or disassembled along the assembly axis 516 during molding of the spray ring 400 shown by FIG. 4 and described above (e.g., injection molding), such that the spray ring 400 is formed as a single, unitary piece (e.g., a single, continuous unit formed from a same material throughout, such as a thermoplastic polymer material, without joints, seams, or fasteners). For example, first mold section 502 may be arranged in face-sharing contact with each of the slides 504 and the second mold section 510, each of the slides 504 may be arranged in face-sharing contact with second mold section 510 and the first mold section 502, and second mold section 510 may be arranged in face-sharing contact with base 512. Further, drain channel insert 508 may be inserted into drain channel slide 506 during molding of the spray ring 400 in order to form the drain channels of the spray ring 400 (e.g., drain channel 408, drain channel 410, etc., as described above with reference to FIG. 4). In particular, the drain channel insert 508 includes an extension 564 configured to protrude outward from the drain channel slide 506, and material injected into the mold assembly 500 during conditions in which the mold assembly 500 is fully assembled may form against the extension 564 and harden against the extension 564 to provide the drain channels of the spray ring 400 (e.g., the material forms around the extension 564 to form the drain channels through the spray ring 400, with the extension 564 being removed from the drain channels during disassembly of the mold assembly 500 following the molding of the spray ring 400).

During molding of the spray ring 400, a plurality of pins 514 are included in the mold assembly 500 in order to form the axial grooves 430, the nozzle orifices 411, and the plurality of nozzle guide surfaces 422 of the spray ring 400. In particular, material injected into the mold assembly 500 during conditions in which the mold assembly 500 is fully assembled may flow against the plurality of pins 514 extending from the base 512 through the second mold section 510 and may harden against the plurality of pins 514. The plurality of pins 514 may be retractable from the mold assembly 500, such that following the molding of the spray ring 400, the plurality of pins 514 may be retracted from the spray ring 400 in the direction of assembly axis 516 (e.g., where the assembly axis 516 is parallel with the central axis 402 shown by FIG. 4 and described above) in order to release from the axial grooves 430, the nozzle orifices 411, and the plurality of nozzle guide surfaces 422 formed in the spray ring 400. In particular, because the pins 514 are retractable in the axial direction parallel with the assembly axis 516, the molding of the spray ring 400 against the pins 514 results in the axial direction of extension of the axial grooves 430 of the spray ring 400. The axial grooves 430 resulting from the inclusion of the pins 514 during molding of the spray ring 400 may increase a flow of coolant to the nozzle orifices of the spray ring 400 during conditions in which the spray ring 400 is included within the electric motor. Additionally, because the pins 514 extend axially (e.g., parallel with the assembly axis 516 and the central axis 402, where each pin of the plurality of pins 514 is parallel with each other pin of the plurality of pins 514), the axial grooves 430 may be formed without drilling or other machining of the spray ring 400. As a result, an ease of manufacturing of the spray ring 400 may be increased, and a cost of the spray ring 400 may be reduced.

During disassembly of the mold assembly 500 (e.g., following the injection molding of the spray ring 400 via the mold assembly 500), the various sections of the mold assembly 500 may be separated from each other (e.g., unsealed from each other) along the assembly axis 516. For example, the first mold section 502 may be separated from the second mold section 510 in the direction of the assembly axis 516. However, some portions of the mold assembly 500 may be separated from the spray ring 400 in different ways. For example, each of the slides 504 may be separated from the spray ring 400 radially (e.g., pulled away from the spray ring 400 in a radial direction of the assembly axis 516). Further, drain channel insert 508 may be separated from the drain channel slide 506 in a direction away from the spray ring 400 and an inner surface 501 of the drain channel slide 506 (e.g., the direction of axis 503). In some examples, the pins 514 may extend through one or more of the first mold section 502 or second mold section 510 during molding of the spray ring 400, and retracting the pins 514 from the spray ring 400 following the molding of the spray ring 400 may include separating the base 512 from the second mold section 510 (e.g., in configurations in which the pins 514 are fixedly coupled to the base 512 and extend through the second mold section 510) to move the plurality of pins 514 out of a cavity formed between the first mold section 502 and second mold section 510.

Assembling the mold assembly 500 for molding (e.g., injection molding) of the spray ring 400 may include sealing the first mold section 502 directly against the second mold section 510, with a planar surface 552 of the first mold section 502 arranged directly in face-sharing contact with a planar surface 554 of the second mold section 510. The planar surface 552 and the planar surface 554 are flat, planar surfaces arranged parallel with each other during conditions in which the mold assembly 500 is assembled. For example, the first mold section 502 may be moved along the assembly axis 516 (e.g., moved in a direction parallel with the assembly axis 516, where the assembly axis 516 intersects a midpoint of the first mold section 502 and is arranged normal to the planar surface 552 and the planar surface 554) into engagement with the second mold section 510 (e.g., engagement of the planar surface 552 with the planar surface 554). Further, the second mold section 510 may be sealed directly against the base 512, with a planar surface 556 of the second mold section 510 arranged opposite to the planar surface 554 (e.g., at an opposing side of the second mold section 510 relative to the planar surface 554) and parallel with the planar surface 554. In particular, the second mold section 510 may be moved along the assembly axis 516 to engage planar surface 556 of the second mold section 510 with planar surface 557 of the base 512, similar to the movement of the first mold section 502 into engagement with the second mold section 510 as described above. The assembly axis 516 is arranged normal to the planar surface 552, planar surface 554, planar surface 556, and planar surface 557.

In the configuration shown by FIG. 5, the second mold section 510 includes an annular surface 558 shaped to mold the inner circumferential surface 413 of the spray ring 400. In particular, during injection molding of the spray ring 400, the material injected into the mold assembly 500 (e.g., thermoplastic polymer material) may surround the annular surface 558 and harden against the annular surface 558 to form the inner circumferential surface 413 of the spray ring 400. Further, the planar surface 552 of the first mold section 502 is shaped to mold an end surface 419 (shown by FIG. 4) of the spray ring 400. In particular, during conditions in which the mold assembly 500 is fully assembled along the assembly axis 516 and material is injected into the mold assembly 500 to form the spray ring 400, the material may flow and harden against the planar surface 552 to form the end surface 419 of the spray ring 400.

Assembly of the mold assembly 500 may include sliding the plurality of slides 504 within the counterpart recesses 550 of the second mold section 510 in a radial direction of cavity 560 formed between the first mold section 502 and the second mold section 510. The second mold section 510 may move along the assembly axis 516 as described above, such that the radial direction of the cavity 560 is the radial direction of the assembly axis 516 (e.g., assembly axis 516 is arranged at a midpoint of the second mold section 510, with the cavity 560 being spaced away from the assembly axis 516 by an equal amount around the assembly axis 516). Each slide of the plurality of slides 504 includes a respective arcuate inner surface (e.g., arcuate inner surface 562) shaped to mold the axial surface 414 (which may be referred to herein as the axial outer surface) of the spray ring 400. In particular, during conditions in which the mold assembly 500 is fully assembled and material is injected into the mold assembly 500 to form the spray ring 400, the material may form against the arcuate inner surfaces and harden against the arcuate inner surfaces to form the axial surface 414 of the spray ring 400.

Referring to FIG. 6, a cross-sectional view of a portion of the spray ring 400 of FIG. 4 is shown. FIG. 6 shows a pair of axial grooves of the plurality of axial grooves 430 described above with reference to FIG. 4. In particular, FIG. 6 shows axial groove 420 and axial groove 431, where each of the axial groove 420 and axial groove 431 are formed in the axial surface 414 described above. Further, FIG. 6 shows a pair of nozzle orifices of the plurality of nozzle orifices 411. In particular, FIG. 6 shows nozzle orifice 606 fluidly coupled to axial groove 420, and nozzle orifice 600 fluidly coupled to axial groove 431. Each of the axial grooves is joined to a respective nozzle orifice of the plurality of nozzle orifices 411. The axial groove 420 is joined to the nozzle orifice 606 by nozzle guide surface 601, and the axial groove 431 is joined to the nozzle orifice 600 by nozzle guide surface 602. Axis 412, parallel with the central axis 402 shown by FIG. 4, and axis 416, radial (or orthogonal) to the central axis 402, are shown by both of FIG. 4 and FIG. 6 for comparison purposes. The axis 416 is arranged parallel with radial surface 418, and the axis 412 is arranged parallel with the axial groove 420.

Each axial groove of the plurality of axial grooves 430 of the spray ring 400, such as axial groove 420 and axial groove 431 shown by FIG. 6, joins to a respective nozzle guide surface of the plurality of nozzle guide surfaces at a radial outer surface of the spray ring. In particular, each axial groove of the plurality of axial grooves 430 is formed together (e.g., molded together) with each nozzle guide surface of the plurality of nozzle guide surfaces. Each axial groove and respective nozzle guide surface together form a respective clearance (e.g., hollow or passage) extending through the spray ring 400 to a respective nozzle orifice, such as clearance 605 shown by FIG. 6. In the example shown by FIG. 6, the axial groove 420 joins to the nozzle guide surface 601 at the radial surface 418, and the axial groove 431 joins to the nozzle guide surface 602 at the radial surface 418. Coolant may be provided to the plurality of nozzle orifices 411 of the spray ring 400 via the plurality of nozzle guide surfaces (which may be referred to herein as curved nozzle guide surfaces) fluidly coupling the plurality of nozzle orifices 411 to the plurality of axial grooves 430. For example, coolant may flow through the axial groove 420 and along the nozzle guide surface 601 to the nozzle orifice 606.

The coolant flowing to the plurality of nozzle orifices may be sprayed from the plurality of nozzle orifices and may be guided toward an end winding 650 (shown schematically by FIG. 6) of the stator of the electric motor that includes the spray ring 400 (e.g., electric motor 300 shown by FIG. 3 and described above) by the plurality of nozzle guide surfaces. In particular, each nozzle guide surface of the plurality of nozzle guide surfaces is shaped to direct the coolant spray from the plurality of nozzle orifices in a direction toward the stator (e.g., each nozzle guide surface is curved in a direction toward the stator and is configured to direct coolant toward the end winding 650 of the stator). In the examples shown, each nozzle guide surface of the plurality of nozzle guide surfaces (e.g., nozzle guide surface 601, nozzle guide surface 602, etc.) curves from radial surface 418 of the spray ring 400 (which may be referred to herein as a radial outer surface of the spray ring 400) to the inner circumferential surface 413. Each nozzle guide surface curves in a direction from the radial surface 418 toward the central opening 403 of the spray ring 400, such that a diameter 610 of the spray ring 400 at the nozzle guide surface 601 is greater than a diameter of the spray ring 400 at the nozzle orifice 606 (e.g., at the inner circumferential surface 413). A circumferential width of each nozzle guide surface of the plurality of nozzle guide surfaces tapers toward the central opening 403 of the spray ring 400, as described further below with reference to FIG. 7. Each nozzle orifice of the plurality of nozzle orifices may be shaped as a rectangular opening at the inner circumferential surface 413, as shown by FIG. 6 (e.g., with nozzle opening 600 having a rectangular shape). By configuring the spray ring 400 as described above, a spray of coolant from each nozzle orifice (e.g., spray 660 from nozzle orifice 600 and spray 662 from nozzle orifice 606) is directed toward the end winding of the stator (e.g., end winding 650), and an amount of coolant coming into direct contact with the end winding may be increased. In some examples, the spray 660 and the spray 662 may be fan shaped, with the fan shape increasing the amount of coolant contacting the stator and end winding. As a result, the stator and end winding may be cooled more effectively, and a performance of the electric motor may be increased.

Further, by configuring the spray ring 400 to include the axial grooves as described above, an amount of coolant flowing to the nozzle orifices may be increased and/or a flow velocity of coolants from the nozzle orifices may be increased. For example, configuring the spray ring 400 to include the axial grooves may increase the flow velocity of coolant to the nozzle orifices relative to examples which do not include axial grooves. In particular, by configuring the axial grooves to extend axially (e.g., parallel with the central axis of the spray ring 400) through the axial surface 414, a length of each axial groove (e.g., length 664 in the direction of the central axis) may be reduced relative to examples which do not include axial grooves. The reduced length of the axial grooves may increase a flow velocity of the coolant through the axial grooves to the nozzle orifices, which may increase a size and/or length of the spray of coolant from the nozzle orifices (e.g., spray 660, spray 662, etc.). The increased size and/or length of the spray may increase an amount of coolant contacting the end winding 650, which may increase a cooling of the end winding 650 and/or end surfaces of the stator (e.g., first end surface 304 and/or second end surface 306 shown by FIG. 3 and described above). By forming the spray ring 400 via injection molding as described above, the axial grooves may more easily be formed with the spray ring 400 to reduce an amount of drilling or other machining of the spray ring 400. In some examples, the axial grooves may be formed integrally with the spray ring 400 (e.g., molded with the spray ring 400 from a same material and using the same mold assembly, such as mold assembly 500 described above with reference to FIG. 5). In such examples, the axial grooves are formed without any machining of the spray ring 400 (e.g., drilling, cutting, etc.), which may reduce a cost and/or assembly time of the spray ring 400.

Figure 7:
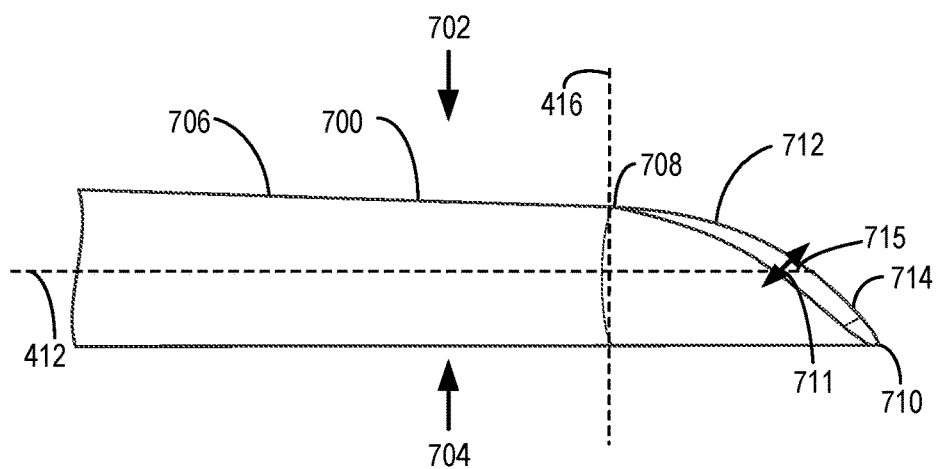
FIG. 7 shows a side view of a pin of the mold assembly of FIG. 5.

Referring to FIG. 7, a side view of a pin 700 of the mold assembly 500 of FIG. 5 is shown. Pin 700 may be included as one pin of the plurality of pins 514 shown by FIG. 5 and described above. The spray ring 400 may be molded around the pin 700 as described above such that the pin 700 forms one of the axial grooves and respective nozzle guide surface and nozzle orifice of the spray ring 400. As one example, the pin 700 may form the axial groove 420, nozzle guide surface 601, and nozzle orifice 606 shown by FIG. 6 and described above. The pin 700 includes an axial section 706 that may form the axial groove and a curved end section 712 that may form the guide surface. In particular, the pin 700 may be a solid, positive form configured to form a hollow (e.g., a passage) within the spray ring 400 during molding of the spray ring 400. The hollow formed by the pin 700 includes the axial groove, the nozzle orifice, and the clearance formed between the axial groove and the nozzle orifice (e.g., clearance 605 formed at least in part by nozzle guide surface 601, as shown by FIG. 6).

The pin 700 includes a first side 702 and a second side 704, where the second side 704 is arranged closer to the central opening 403 of the spray ring 400 during molding of the spray ring 400. The second side 704 of the axial section 706 forms a closed end of the axial groove (e.g., an end closed by axial surface 414), while the first side 702 forms an open end of the axial groove. The nozzle guide surface (e.g., nozzle guide surface 601) is formed by the curved end section 712, with a first edge 708 of the curved end section 712 configured to be arranged at the radial surface 418 of the spray ring 400, and with the second edge 710 configured to be arranged at the nozzle orifice (e.g., nozzle orifice 606 shown by FIG. 6). A circumferential width 711 of the pin 700 (e.g., a width of the pin 700 in a circumferential direction 424 of the spray ring 400, shown by FIG. 4) tapers between the first edge 708 and the second edge 710. In particular, the circumferential width 711 tapers to enlarge in a direction from the first edge 708 toward the second edge 710 to a midpoint 715 of the curved end surface 714 (where the midpoint 715 is intersected by axis 412), and the circumferential width 711 tapers to reduce from the midpoint 715 toward the second edge 710. As a result, during molding of the spray ring 400, the circumferential width of the nozzle guide surface formed by the pin 700 (e.g., nozzle guide surface 601) tapers from the radial surface 418 toward the nozzle orifice formed by the pin 700 (e.g., nozzle orifice 606) in a similar way (e.g., the curvature and tapering of the nozzle guide surface is the same as the curvature and tapering of the curved end section 712). The curvature and tapering of the nozzle guide surface (e.g., nozzle guide surface 601) resulting from the curvature and tapering of the pin 700 during molding of the spray ring 400, as described above, guides the spray of coolant (e.g., spray 662) from the corresponding joined nozzle orifice (e.g., nozzle orifice 606) of the spray ring 400 toward the end winding (e.g., end winding 650) and the stator (e.g., stator 302 shown by FIG. 3 and described above). As a result, cooling of the stator and end winding may be increased.

Figure 8:
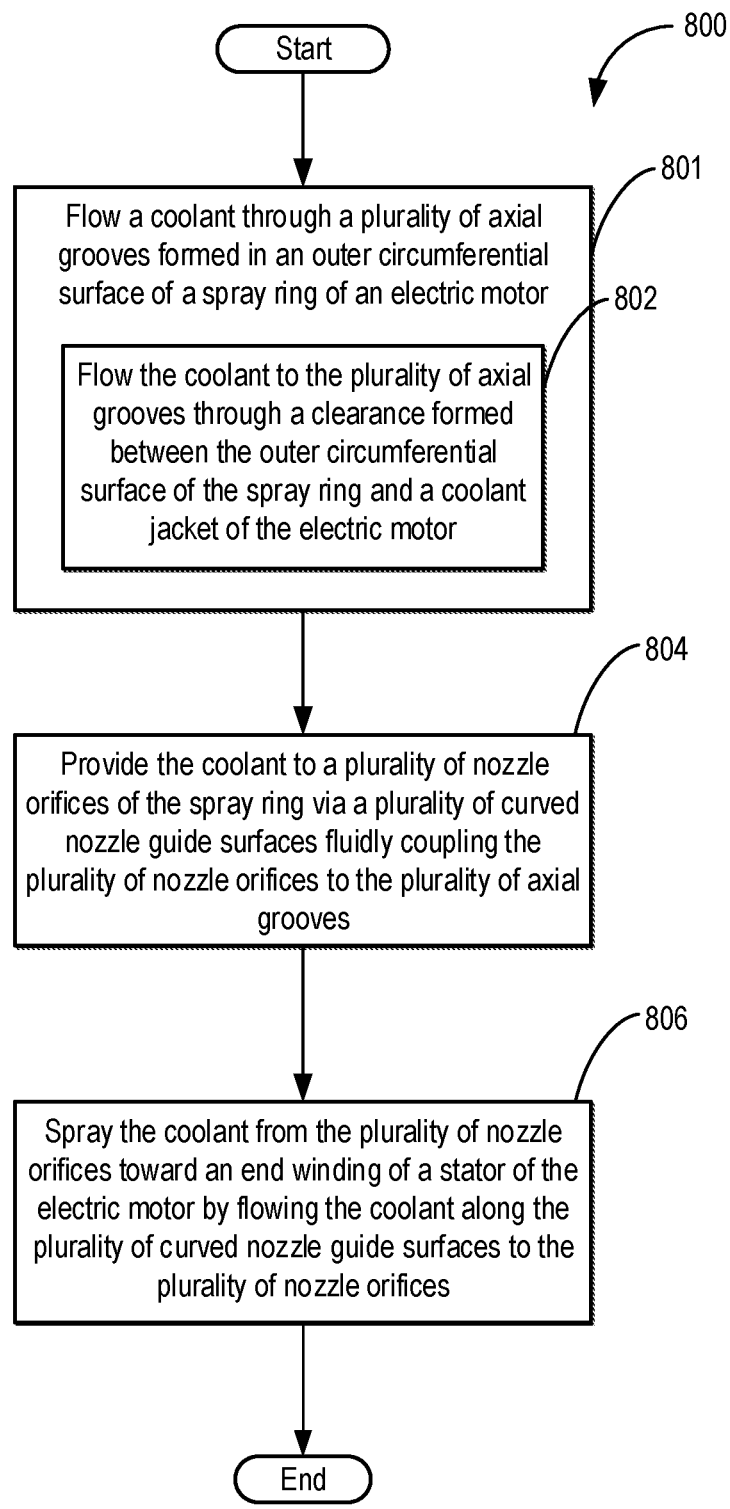
FIG. 8 shows a flowchart illustrating a method for flowing coolant through a spray ring of an electric motor.

Referring to FIG. 8, a flowchart illustrating a method 800 for flowing coolant through a spray ring of an electric motor is shown. In some examples, the spray ring may be similar to, or the same as, the spray ring 400 described above with reference to FIGS. 4-7, the first spray ring 326 and/or second spray ring 328 shown by FIG. 3 and described above, etc. The electric motor may be similar to, or the same as, the electric motor 300 shown by FIG. 3 and described above, the electric motor 200 shown by FIG. 2 and described above, and/or the electric motor 152 or electric motor 120 shown by FIG. 1 and described above. Instructions for carrying out method 800 and the rest of the methods included herein may be executed by a controller (e.g., electronic controller 150 shown by FIG. 1 and described above) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 801, the method includes flowing a coolant through a plurality of axial grooves formed in an outer circumferential surface of the spray ring of the electric motor. The plurality of axial grooves may be similar to, or the same as, the plurality of axial grooves 430 described above, and the outer circumferential surface may be similar to, or the same as, the axial surface 414 described above (e.g., where the axial surface 414 extends in the direction of the central axis of the spray ring 400 and curves around an entire circumference of the spray ring 400).

Flowing the coolant through the plurality of axial grooves formed in the outer circumferential surface of the spray ring of the electric motor at 801 may include, at 802, flowing the coolant to the plurality of axial grooves through a clearance formed between the outer circumferential surface of the spray ring and a coolant jacket of the electric motor. For example, the coolant (e.g., oil) may flow through the electric motor and may flow to the plurality of axial grooves via the clearance formed between the spray ring and the coolant jacket of the electric motor, where the clearance may be similar to, or the same as, the clearance 336 arranged between the first spray ring 326 and the coolant jacket 312 shown by FIG. 3 and described above. The coolant jacket may be similar to, or the same as, the coolant jacket 312.

At 804, the method includes providing the coolant to a plurality of nozzle orifices of the spray ring via a plurality of curved nozzle guide surfaces fluidly coupling the plurality of nozzle orifices to the plurality of axial grooves. The plurality of nozzle orifices of the spray ring may be similar to, or the same as, the plurality of nozzle orifices 411 described above, and the plurality of curved nozzle guide surfaces may be similar to, or the same as, the plurality of nozzle guide surfaces 422 described above. Providing the coolant to the plurality of nozzle orifices includes flowing the coolant through the plurality of axial grooves and along the plurality of nozzle guide surfaces to the plurality of nozzle orifices. In particular, each axial groove flows coolant to a respective nozzle orifice via a respective curved nozzle guide surface, where the nozzle guide surface is arranged between the axial groove and the nozzle orifice.

At 806, the method includes spraying the coolant from the plurality of nozzle orifices toward an end winding of a stator of the electric motor by flowing the coolant along the plurality of curved nozzle guide surfaces to the plurality of nozzle orifices. The end winding may be similar to, or the same as, the end winding 650 shown by FIG. 6 and described above, and/or the first end winding 344 or second end winding 346 shown by FIG. 3 and described above. The stator may be similar to, or the same as, the stator 302 shown by FIG. 3 and described above. Spraying the coolant from the plurality of nozzle orifices may include spraying the coolant in a fan shape from the nozzle orifices, similar to the spray 662 and spray 660 described above.

In this way, by injection molding the spray ring to include the molded axial grooves joined to the molded nozzle orifices via the molded nozzle guide surfaces, coolant may be more effectively directed toward the stator and end windings. Because the end windings may have a higher operating temperature than other components of the electric motor, the coolant sprayed toward the stator by the spray ring may increase a cooling of the end windings, and motor performance may be increased. Further, because the axial grooves extend axially through the spray ring, a length of each axial groove may be smaller relative to grooves that are not oriented axially, and the flow velocity of coolant through the axial grooves may be increased. The increased flow velocity may increase a size and/or reach of the coolant sprayed from the spray ring, which may further increase cooling of the end windings and stator. The spray ring, formed by injection molding via the mold assembly including retractable pins configured to form the axial grooves, may have a reduced weight and/or cost relative to spray rings that are not injection molded, and the orientation of the axial grooves may increase an ease of the injection molding. As a result, an ease of manufacturing of the spray ring may be increased, a manufacturing time of the spray ring may be reduced, and a cost of the spray ring may be reduced relative to spray rings that are not injection molded.

FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

In one embodiment, a spray ring for an electric motor comprises: an outer circumferential surface including a plurality of axial grooves; an inner circumferential surface including a plurality of nozzle orifices in fluidic communication with the plurality of axial grooves; and a plurality of nozzle guide surfaces formed through the spray ring and extending from the plurality of axial grooves to the plurality of nozzle orifices in a direction toward a central opening of the spray ring. In a first example of the spray ring, each nozzle guide surface of the plurality of nozzle guide surfaces curves from a radial outer surface of the spray ring to the inner circumferential surface. A second example of the spray ring optionally includes the first example, and further includes wherein each nozzle orifice of the plurality of nozzle orifices is shaped as a rectangular opening at the inner circumferential surface. A third example of the spray ring optionally includes one or both of the first and second examples, and further includes wherein each axial groove of the plurality of axial grooves extends parallel with a central axis of the spray ring. A fourth example of the spray ring optionally includes one or more or each of the first through third examples, and further includes wherein each axial groove of the plurality of axial grooves is opened at a first end of the spray ring opposite to the plurality of nozzle guide surfaces. A fifth example of the spray ring optionally includes one or more or each of the first through fourth examples, and further includes wherein each axial groove of the plurality of axial grooves joins to a respective nozzle guide surface of the plurality of nozzle guide surfaces at a radial outer surface of the spray ring. A sixth example of the spray ring optionally includes one or more or each of the first through fifth examples, and further includes a circumferential drain channel formed at the inner circumferential surface and extending through a thickness of the spray ring. A seventh example of the spray ring optionally includes one or more or each of the first through sixth examples, and further includes wherein the plurality of nozzle guide surfaces is radially symmetric around the central opening. An eighth example of the spray ring optionally includes one or more or each of the first through seventh examples, and further includes wherein the plurality of axial grooves is radially symmetric around the central opening, with each axial groove of the plurality of axial grooves joined to a respective nozzle guide surface of the plurality of nozzle guide surfaces. A ninth example of the spray ring optionally includes one or more or each of the first through eighth examples, and further includes wherein a circumferential width of each nozzle guide surface of the plurality of nozzle guide surfaces tapers toward the central opening. A tenth example of the spray ring optionally includes one or more or each of the first through ninth examples, and further includes wherein a diameter of the spray ring at the plurality of nozzle guide surfaces is greater than a diameter of the spray ring at the plurality of nozzle orifices.

In one embodiment, an electric motor comprises: a stator including an end winding; and a first spray ring including: a plurality of axial grooves spaced apart in a circumferential direction along an outer circumferential surface of the first spray ring; a plurality of nozzle orifices arranged at an inner circumferential surface of the first spray ring, in fluidic communication with the plurality of axial grooves; and a plurality of nozzle guide surfaces extending through the first spray ring and joining the plurality of axial grooves to the plurality of nozzle orifices, with the plurality of nozzle guide surfaces shaped to direct a coolant spray from the plurality of nozzle orifices to the end winding. In a first example of the electric motor, each nozzle guide surface of the plurality of nozzle guide surfaces is curved in a direction toward the stator. A second example of the electric motor optionally includes the first example, and further includes a coolant jacket, where the plurality of axial grooves is fluidly coupled to a clearance disposed between the outer circumferential surface of the first spray ring and the coolant jacket. A third example of the electric motor optionally includes one or both of the first and second examples, and further comprises a drain channel formed through the inner circumferential surface of the first spray ring at a bottom end of the electric motor. A fourth example of the electric motor optionally includes one or more or each of the first through third examples, and further includes wherein the plurality of nozzle orifices is arranged between the plurality of axial grooves and the stator. A fifth example of the electric motor optionally includes one or more or each of the first through fourth examples, and further includes a second spray ring arranged opposite to the first spray ring across the stator, where the second spray ring includes a second plurality of nozzle guide surfaces that is mirror symmetric to the plurality of nozzle guide surfaces of the first spray ring.

In one embodiment, a method comprises: flowing a coolant through a plurality of axial grooves formed in an outer circumferential surface of a spray ring of an electric motor; and providing the coolant to a plurality of nozzle orifices of the spray ring via a plurality of curved nozzle guide surfaces fluidly coupling the plurality of nozzle orifices to the plurality of axial grooves. In a first example of the method, the method further comprises spraying the coolant from the plurality of nozzle orifices toward an end winding of a stator of the electric motor by flowing the coolant along the plurality of curved nozzle guide surfaces to the plurality of nozzle orifices. A second example of the method optionally includes the first example, and further includes flowing the coolant to the plurality of axial grooves through a clearance formed between the outer circumferential surface of the spray ring and a coolant jacket of the electric motor.

In one embodiment, a method of manufacture comprises: forming, via injection molding, a unitary electric motor spray ring including a plurality of axial grooves joined to a plurality of nozzle orifices. In a first example of the method, the method further comprises seating a first mold section against a mold base, where the first mold section includes an annular surface shaped to mold an inner circumferential surface of the electric motor spray ring. A second example of the method optionally includes the first example, and further includes seating a second mold section against the first mold section, where the second mold section includes a planar surface shaped to mold an end surface of the electric motor spray ring. A third example of the method optionally includes one or both of the first and second examples, and further includes seating a plurality of slides within a plurality of counterpart recesses of the first mold section, where each slide of the plurality of slides includes a respective arcuate inner surface shaped to mold an axial outer surface of the electric motor spray ring. A fourth example of the method optionally includes one or more or each of the first through third examples, and further includes seating a drain channel insert within a drain channel slide of the plurality of slides, where the drain channel insert protrudes from the drain channel slide and is shaped to mold a drain channel of the electric motor spray ring. A fifth example of the method optionally includes one or more or each of the first through fourth examples, and further includes wherein seating the first mold section against the mold base further comprises positioning a plurality of pins extending from the mold base within an opening of the first mold section, where the plurality of pins is shaped to mold the plurality of axial grooves and the plurality of nozzle orifices. A sixth example of the method optionally includes one or more or each of the first through fourth examples, and further includes wherein the plurality of pins is shaped to mold a plurality of nozzle guide surfaces joined to the plurality of nozzle orifices.

In another embodiment, a method of manufacture for an electric motor spray ring comprises: sealing a first mold section against a base; sealing a second mold section against the first mold section; and injecting a material into a cavity, formed between the first mold section and second mold section, against a plurality of pins extending from the base into the cavity. In a first example of the method, sealing the first mold section against the base includes moving a first planar surface of the first mold section into engagement with a second planar surface of the base along an assembly axis normal to the first planar surface and the second planar surface. A second example of the method optionally includes the first example, and further includes unsealing the base from the first mold section and removing the plurality of pins from the cavity by moving the first mold section away from the base along the assembly axis. A third example of the method optionally includes one or both of the first and second examples, and further includes seating a plurality of slides against a plurality of counterpart recesses of the first mold section. A fourth example of the method optionally includes one or more or each of the first through third examples, and further includes, while sealing the second mold section against the first mold section, sliding each slide of the plurality of slides in a radial direction of the cavity. A fifth example of the method optionally includes one or more or each of the first through fourth examples, and further includes coupling an insert to a drain channel slide of the plurality of slides, with an extension of the insert extending into the cavity. A sixth example of the method optionally includes one or more or each of the first through fifth examples, and further includes wherein the material is a thermoplastic polymer. A seventh example of the method optionally includes one or more or each of the first through sixth examples, and further includes wherein each pin of the plurality of pins extends in a normal direction of the base. An eighth example of the method optionally includes one or more or each of the first through seventh examples, and further includes wherein each pin of the plurality of pins extends parallel with each other pin of the plurality of pins.

In one embodiment, an injection molded spray ring for an electric motor comprises: a plurality of axial grooves molded in an outer circumferential surface; a plurality of nozzle orifices molded in an inner circumferential surface, in fluidic communication with the plurality of axial grooves; and a plurality of nozzle guide surfaces molded between the plurality of axial grooves and the plurality of nozzle orifices and curving in a direction toward a central opening of the spray ring. In a first example of the injection molded spray ring, each nozzle guide surface of the plurality of nozzle guide surfaces is molded with a tapering circumferential width toward the plurality of nozzle orifices. A second example of the injection molded spray ring optionally includes the first example, and further includes wherein each axial groove of the plurality of axial grooves extends parallel with a central axis of the injection molded spray ring and joins to a respective nozzle guide surface of the plurality of nozzle guide surfaces at a radial outer surface molded orthogonal to the outer circumferential surface. A third example of the injection molded spray ring optionally includes one or both of the first and second examples, and further includes a drain channel molded through the inner circumferential surface.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of manufacture, comprising:
seating a first mold section against a mold base and positioning a plurality of pins extending from the mold base through the first mold section, wherein the first mold section includes an annular surface shaped to mold an inner circumferential surface of a unitary electric motor spray ring; and
forming, via injection molding, the electric motor spray ring including a plurality of axial grooves joined to a plurality of nozzle orifices, the plurality of nozzle orifices being at the inner circumferential surface, the electric motor spray ring formed with a first ring structure and a second ring structure that is directly adjacent to the first ring structure in an axial direction,
wherein the plurality of pins is shaped to mold the plurality of axial grooves and the plurality of nozzle orifices; and
wherein the plurality of axial grooves are formed into an axial surface of the first ring structure of the electric motor spray ring,
the plurality of axial grooves extending in the axial direction across an entire axial width of the first ring structure from a first radial surface of the first ring structure to a juncture where the axial surface of the first ring structure and a second radial surface of the second ring structure of the electric motor spray ring meet, and wherein the first radial surface is an end surface of the electric motor spray ring.

2. The method of claim 1, further comprising:
seating a second mold section against the first mold section, wherein the second mold section includes a planar surface shaped to mold the end surface of the electric motor spray ring.

3. The method of claim 1, further comprising seating a plurality of slides within a plurality of counterpart recesses of the first mold section, wherein each slide of the plurality of slides includes a respective arcuate inner surface shaped to mold an axial outer surface of the electric motor spray ring.

4. The method of claim 3, further comprising seating a drain channel insert within a drain channel slide of the plurality of slides, wherein the drain channel insert protrudes from the drain channel slide and is shaped to mold a drain channel of the electric motor spray ring.

5. The method of claim 1, wherein the plurality of pins is shaped to mold a plurality of nozzle guide surfaces joined to the plurality of nozzle orifices.

6. The method of claim 1, wherein a diameter of the first ring structure is smaller than a diameter of the second ring structure of the electric motor spray ring, and wherein the second ring structure extends along an entire circumference of the first ring structure.

7. The method of claim 6, wherein each nozzle guide surface of a plurality of nozzle guide surfaces curves from the second radial surface to the inner circumferential surface.

8. A method of manufacture for an electric motor spray ring, comprising:
sealing a first mold section against a base;
sealing a second mold section against the first mold section; and
injecting a material into a cavity, wherein the cavity is formed between the first mold section and the second mold section, wherein the cavity is configured to form a unitary electric motor spray ring, the unitary electric motor spray ring comprising a first ring structure and a second ring structure that is directly adjacent to the first ring structure in an axial direction, and wherein the material injected into the cavity is further injected against a plurality of pins extending from the base into the cavity configured to form into an axial surface of the electric motor spray ring with a plurality of axial grooves extending in the axial direction across an entire axial width of the first ring structure from a first radial surface of the first ring structure to a juncture where the axial surface of the first ring structure and a second radial surface of the second ring structure meet, and wherein the first radial surface is an end surface of the electric motor spray ring.

9. The method of claim 8, wherein sealing the first mold section against the base includes moving a first planar surface of the first mold section into engagement with a second planar surface of the base along an assembly axis normal to the first planar surface and the second planar surface.

10. The method of claim 9, further comprising unsealing the base from the first mold section and removing the plurality of pins from the cavity by moving the first mold section away from the base along the assembly axis.

11. The method of claim 8, further comprising seating a plurality of slides against a plurality of counterpart recesses of the first mold section.

12. The method of claim 11, further comprising, while sealing the second mold section against the first mold section, sliding each slide of the plurality of slides in a radial direction of the cavity.

13. The method of claim 11, further comprising coupling an insert to a drain channel slide of the plurality of slides, with an extension of the insert extending into the cavity.

14. The method of claim 8, wherein the material is a thermoplastic polymer.

15. The method of claim 8, wherein each pin of the plurality of pins extends in a normal direction of the base, and wherein the juncture where the axial surface and the second radial surface of the electric motor spray ring meet is a substantially orthogonal juncture.

16. The method of claim 8, wherein each pin of the plurality of pins extends parallel with each other pin of the plurality of pins, and wherein the plurality of pins are positioned to form the plurality of axial grooves at substantially equidistant spacing along an entire circumference of the electric motor spray ring.

17. An injection molded spray ring for an electric motor, comprising:
a plurality of axial grooves molded in an outer circumferential surface;
a plurality of nozzle orifices molded in an inner circumferential surface, in fluidic communication with the plurality of axial grooves; and
a plurality of nozzle guide surfaces molded between the plurality of axial grooves and the plurality of nozzle orifices and curving in a direction toward a central opening of the spray ring,
wherein the plurality of axial grooves are formed into an axial surface of the spray ring, the plurality of axial grooves extending from a first radial surface of the spray ring to a juncture where the axial surface and a second radial surface of the spray ring meet, and wherein the first radial surface is an end surface of the spray ring.

18. The injection molded spray ring of claim 17, wherein each nozzle guide surface of the plurality of nozzle guide surfaces is molded with a tapering circumferential width toward the plurality of nozzle orifices.

19. The injection molded spray ring of claim 17, wherein each axial groove of the plurality of axial grooves extends parallel with a central axis of the injection molded spray ring and joins to a respective nozzle guide surface of the plurality of nozzle guide surfaces at a radial outer surface molded orthogonal to the outer circumferential surface.

20. The injection molded spray ring of claim 17, further comprising a drain channel molded through the inner circumferential surface.

\* \* \* \* \*